(12) United States Patent
Oono

(10) Patent No.: US 11,047,629 B2
(45) Date of Patent: *Jun. 29, 2021

(54) FIN-ASSEMBLED TUBE MANUFACTURING METHOD AND DOUBLE TUBE MANUFACTURING METHOD

(71) Applicant: Marelli Cabin Comfort Japan Corporation, Saitama (JP)

(72) Inventor: Hiroyuki Oono, Saitama (JP)

(73) Assignee: Marelli Cabin Comfort Japan Corporation, Saitama (JP)

(*) Notice: Subject to any disclaimer, the term of this patent is extended or adjusted under 35 U.S.C. 154(b) by 101 days.

This patent is subject to a terminal disclaimer.

(21) Appl. No.: 16/343,589

(22) PCT Filed: Nov. 7, 2017

(86) PCT No.: PCT/JP2017/040114
§ 371 (c)(1),
(2) Date: Apr. 19, 2019

(87) PCT Pub. No.: WO2018/088395
PCT Pub. Date: May 17, 2018

(65) Prior Publication Data
US 2020/0049427 A1 Feb. 13, 2020

(30) Foreign Application Priority Data

Nov. 11, 2016 (JP) ............................. JP2016-220484
Nov. 11, 2016 (JP) ............................. JP2016-220485
Nov. 11, 2016 (JP) ............................. JP2016-220492

(51) Int. Cl.
*B21D 11/14* (2006.01)
*B21C 37/26* (2006.01)
(Continued)

(52) U.S. Cl.
CPC ............... *F28F 1/40* (2013.01); *B21D 11/14* (2013.01); *B23P 15/26* (2013.01); *F28D 7/10* (2013.01); *B21C 37/26* (2013.01)

(58) Field of Classification Search
CPC ...... B23P 2700/09; B23P 15/26; B21D 11/06; B21D 11/14; B21D 53/02; B21D 53/027; B21D 53/08; B21C 37/26
See application file for complete search history.

(56) References Cited

U.S. PATENT DOCUMENTS 2,929,434 A * 3/1960 Barnes .................. B21D 11/14
72/319
3,777,343 A * 12/1973 D'Onofrio ............. B21D 15/04
29/890.036
(Continued)

FOREIGN PATENT DOCUMENTS

GB 1028000 A 5/1966
JP S50-049762 U 5/1975
(Continued)

OTHER PUBLICATIONS

Machine Translation of JP 04-35730 Y (Year: 1992).*

*Primary Examiner* — Christopher J Besler
(74) *Attorney, Agent, or Firm* — Young Basile Hanlon & MacFarlane, P.C.

(57) ABSTRACT

In a method of manufacturing a fin-assembled tube by arranging a helical fin in an interior of a tube, a plate-shaped fin material is inserted into the interior of the tube and the helical fin is formed by twisting the fin material in the interior of the tube.

11 Claims, 10 Drawing Sheets

(51) Int. Cl.
*F28F 1/40* (2006.01)
*F28D 7/10* (2006.01)
*B23P 15/26* (2006.01)

(56) References Cited

U.S. PATENT DOCUMENTS

| | | | |
|---|---|---|---|
| 2004/0154366 A1 | | 8/2004 | Schule |
| 2009/0095044 A1 | | 4/2009 | Schule |
| 2020/0056847 A1 | * | 2/2020 | Oono ..................... B21D 39/04 |
| 2020/0166281 A1 | * | 5/2020 | Oono ........................ F28F 1/40 |

FOREIGN PATENT DOCUMENTS

| | | | |
|---|---|---|---|
| JP | S60-159861 U | | 10/1985 |
| JP | S61-063580 U | | 4/1986 |
| JP | S63-005277 U | | 1/1988 |
| JP | H01-101092 U | | 7/1989 |
| JP | 04-35730 Y | * | 8/1992 |
| JP | H04-339531 A | | 11/1992 |
| JP | H07-033416 U | | 6/1995 |
| JP | 2002-318083 A | | 10/2002 |
| JP | 2004-528480 A | | 9/2004 |
| JP | 2006-098038 A | | 4/2006 |
| JP | 2010-144970 A | | 7/2010 |
| JP | 2011-027285 A | | 2/2011 |

* cited by examiner

FIN-ASSEMBLED TUBE MANUFACTURING METHOD AND DOUBLE TUBE MANUFACTURING METHOD

CROSS-REFERENCE TO RELATED APPLICATIONS

This application claims priority to Japanese Application Serial No. 2016-220484, filed Nov. 11, 2016, Japanese Application Serial No. 2016-220485, filed Nov. 11, 2016 and Japanese Application Serial No. 2016-220492, filed Nov. 11, 2016, the entire disclosures of which are hereby incorporated by reference.

TECHNICAL FIELD

The present invention relates to a method of manufacturing a fin-assembled tube by arranging a helical fin in an interior of a tube and a method of manufacturing a double tube having the fin-assembled tube.

BACKGROUND

JP2006-098038A discloses a heat exchange pipe provided with a helical thin plate in an interior of a pipe.

When the above-described heat exchange pipe is manufactured, the thin plate is first formed into a helical-shape. Thereafter, the formed helical-shaped thin plate is inserted into an interior of the pipe.

During the manufacture of the heat exchange pipe disclosed in JP2006-098038A, because dimension errors are caused when the thin plate is formed into a helical shape, there is a risk in that it becomes difficult to insert the helical-shaped thin plate thus formed into the interior of the pipe.

SUMMARY

An object of the present invention is to improve an assemblability of a fin-assembled tube in a method of manufacturing the fin-assembled tube.

According to one aspect of the present invention, a method of manufacturing a fin-assembled tube by arranging a helical fin in an interior of a tube, including: a step of inserting a plate-shaped fin material into the interior of the tube; and a step of forming the helical fin by twisting the fin material in the interior of the tube.

According to the above-described aspect, because a helical fin is formed by twisting a fin material in an interior of a tube, a step of inserting the formed helical fin into the interior of the tube is no longer required. Thus, it is possible to improve an assemblability of the fin-assembled tube.

DETAILED DESCRIPTION

Embodiments of the present invention will be described below with reference to the attached drawings.

Figure 1:
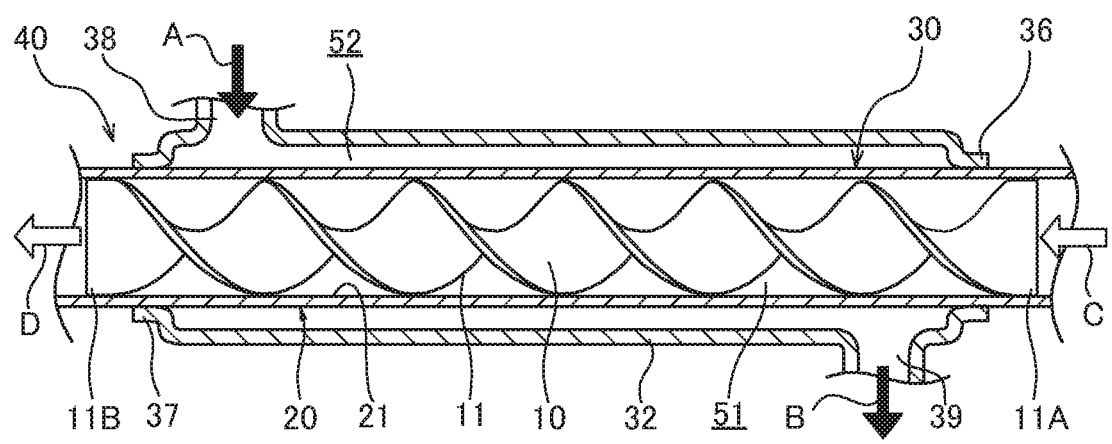
FIG. 1 is a sectional view showing a double tube to which a fin-assembled tube according to an embodiment of the present invention is applied.

A double tube 40 shown in FIG. 1 is provided as a heat exchanger for an air-conditioning device (not shown) through which refrigerant (fluid) circulates.

The double tube 40 is provided with a cylindrical inner tube 20 forming an inner flow channel 51 in an interior thereof and a cylindrical outer tube 32 that forms an outer flow channel 52 around the inner tube 20. Pipes (not shown) for guiding the refrigerant are connected to both end portions of the inner tube 20. Both end portions 36 and 37 of the outer tube 32 are joined to an outer circumference of the inner tube 20. The outer tube 32 has an inlet 38 and an outlet 39 to which pipes (not shown) for guiding the refrigerant are connected.

As shown by arrows A and B, high-temperature-high-pressure liquid refrigerant flows through the outer flow channel 52 via the inlet 38 and the outlet 39. As shown by arrows C and D, low-temperature-low-pressure gaseous refrigerant flows through the inner flow channel 51. In the double tube 40, a heat exchange takes place between the refrigerants flowing through the outer flow channel 52 and the inner flow channel 51.

A helical fin 10 is arranged in the interior of the inner tube 20. As described later, the helical fin 10 is formed by twisting a flat fin material 11 into a helical shape. Both end portions 11A and 11B of the fin material 11 are fixed to an inner surface 21 of the inner tube 20 by, for example, crimping. Respective members 32, 20, and 10 are made of, for example, metals such as aluminum, etc.

The inner tube 20 and the helical fin 10 form a fin-assembled tube 30 as a component of the heat exchanger. In the fin-assembled tube 30, the refrigerant flowing through the inner flow channel 51 flows by swirling helically along the helical fin 10, and thereby, the heat exchange via the inner tube 20 is facilitated for the refrigerant.

Next, a manufacturing apparatus 50 of the fin-assembled tube 30 will be described with reference to FIG. 2.

The manufacturing apparatus 50 includes a core rod 60 that is inserted into the interior of the inner tube 20, a chuck 70 that holds the outer circumference of the inner tube 20, and a bending machine 80 that supports the outer circumference of the inner tube 20 in a freely slidable manner.

The manufacturing apparatus 50 includes an actuating mechanism 65 for actuating the core rod 60 and an actuating mechanism 75 for actuating the chuck 70. As shown by an arrow E, the actuating mechanism 65 rotationally actuates the core rod 60 about an axis O of the inner tube 20, and as shown by an arrow F, moves the core rod 60 in the axis O direction. As shown by an arrow H, the actuating mechanism 75 moves the chuck 70 in the axis O direction. Operation of the actuating mechanisms 65 and 75 and the bending machine 80 is controlled by a controller (not shown).

The bending machine 80 includes a bend die 81, a pressure die 82, and a clamp die 83. The bending machine 80 is configured such that the inner tube 20 sent out by the actuating mechanism 75 is bent so as to follow a groove of the bend die 81 as the bend die 81 and the clamp die 83 are rotated about the bending center axis S while holding the inner tube 20.

For a case in which the bending process of the inner tube 20 is not performed, the manufacturing apparatus 50 may be provided with, instead of the bending machine 80, a guide member that supports the outer circumference of the inner tube 20 in a freely slidable manner in the axis O.

The core rod 60 has a columnar base end portion 62 extending in the axis direction, a support portion 63, and a tip-end portion 64. The core rod 60 also has a slit 61 that opens over between the support portion 63 and the tip-end portion 64.

The base end portion 62 of the core rod 60 is a portion to be linked to the actuating mechanism 65.

The support portion 63 of the core rod 60 is a portion to support the tip-end portion 64 with respect to the base end portion 62. The support portion 63 is formed so as to have a diameter smaller than those of the base end portion 62 and the tip-end portion 64 and extends in the axis O direction such that a gap is formed between the support portion 63 and the inner surface 21 of the inner tube 20. With such a configuration, sliding resistance of the core rod 60 is minimized.

The tip-end portion 64 has a circular outer shape that slides on the inner surface 21 of the inner tube 20. When the inner tube 20 is bent by the bending machine 80, an outer circumference of the tip-end portion 64 of the core rod 60 is brought into contact with the inner surface 21 of the inner tube 20. With such a configuration, a bent portion of the inner tube 20 is formed, and formation of forming failures such as wrinkles etc. to this bent portion is suppressed.

The slit 61 is a gap having a constant opening width and extending in the axis O direction and forms a support wall portion that supports the fin material 11 received in the core rod 60.

Next, steps for manufacturing the fin-assembled tube 30 using the manufacturing apparatus 50 will be described in order with reference to FIGS. 2 to 5.

Figure 2:
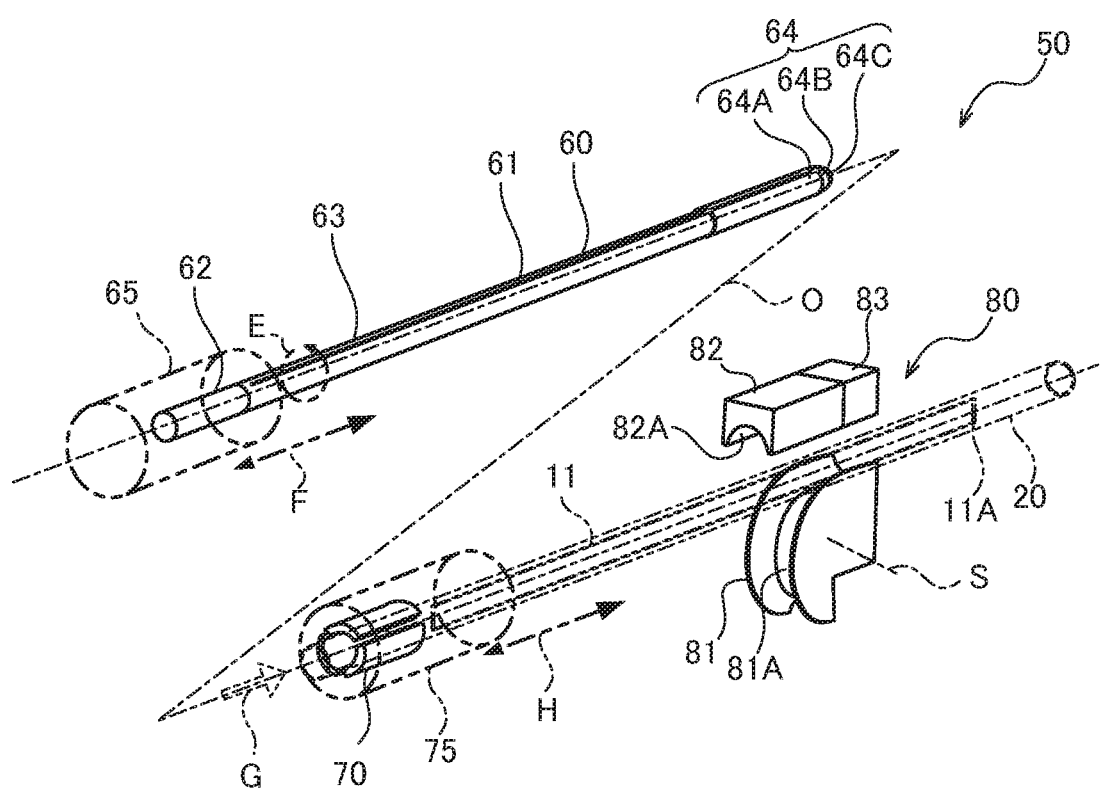
FIG. 2 is a perspective view showing a manufacturing apparatus of the fin-assembled tube.

As shown by an arrow G in FIG. 2, the fin material 11 is first inserted into the inner tube 20. Next, a tip-end portion 11A of the fin material 11 is fixed to the inner tube 20 by crimping the outer circumference of the inner tube 20.

Here, the configuration is not limited to the one described above, and it may be possible to employ a configuration in which, for example, the tip-end portion 11A of the fin material 11 fixed to the inner tube 20 by press-fitting the tip-end portion 11A to the inner surface 21 of the inner tube 20.

Figure 3:
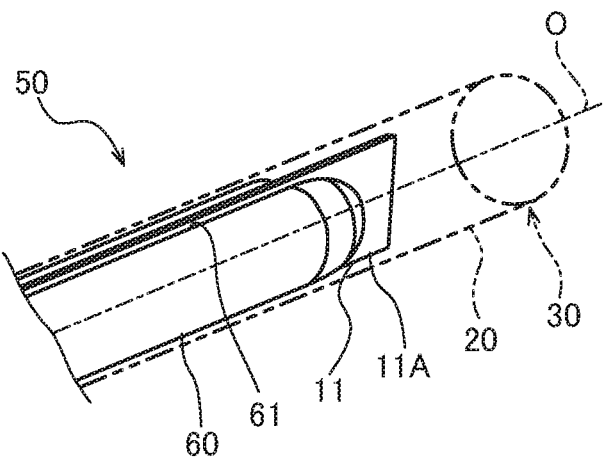
FIG. 3 is a perspective view showing a step for manufacturing the fin-assembled tube.

Then, as shown in FIG. 3, the core rod 60 is inserted into the inner tube 20. At this time, the fin material 11 is inserted into the slit 61 of the core rod 60.

Figure 4:
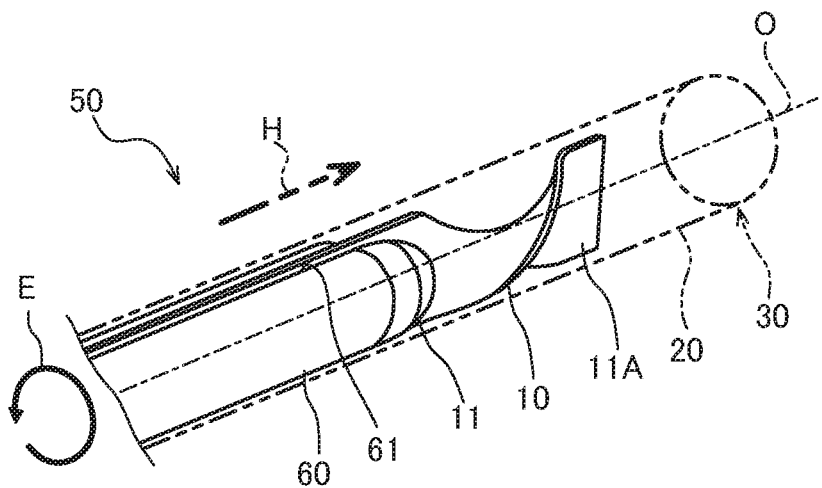
FIG. 4 is a perspective view showing a step for manufacturing the fin-assembled tube.
Figure 5:
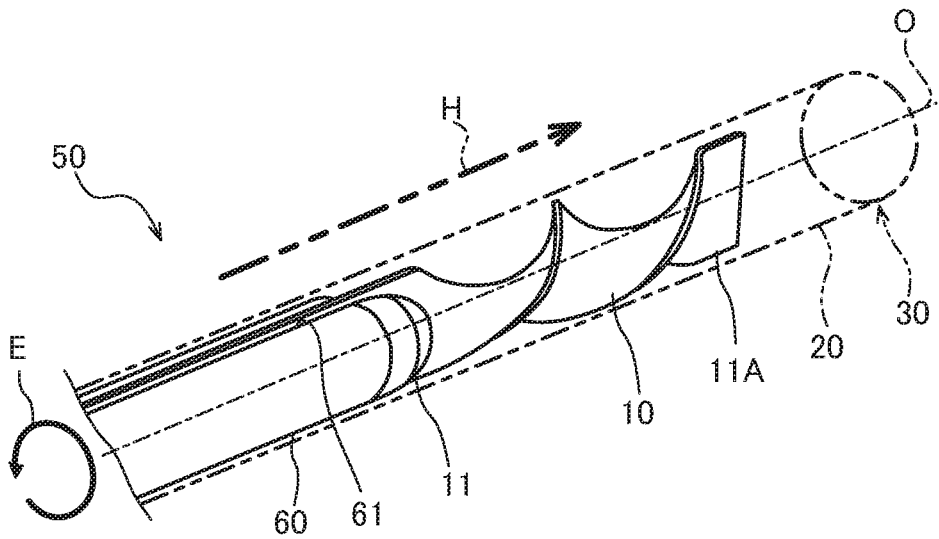
FIG. 5 is a perspective view showing a step for manufacturing the fin-assembled tube.

Thereafter, as shown by the arrow H in FIGS. 4 and 5, the inner tube 20 is moved in the axis O direction with respect to the core rod 60, and as shown by the arrow E in FIGS. 4 and 5, the core rod 60 is rotated in one direction with respect to the inner tube 20.

By doing so, the fin material 11 being pulled out of the slit 61 of the core rod 60 is twisted by utilizing the tip-end portion 11A as a supporting point. By doing so, the helical fin 10 is formed in the interior of the inner tube 20.

Then, a base end portion 11B of the fin material 11 is fixed to the inner tube 20 by crimping the outer circumference of the inner tube 20.

As described above, the fin-assembled tube 30 is manufactured. Thereafter, the double tube 40 is manufactured by joining the fin-assembled tube 30 to the outer tube 32.

As described above, according to this embodiment, there is provided a method of manufacturing the fin-assembled tube 30 including a step of inserting the plate-shaped fin material 11 into the interior of the inner tube 20 (tube) and a step of forming the helical fin 10 by twisting the fin material 11 in the interior of the inner tube 20.

With such a method, by forming the helical fin 10 by twisting the fin material 11 in the interior of the inner tube 20, a step of inserting the helical fin 10, which has been subjected to the forming, into the interior of the inner tube 20 is no longer required. Therefore, it is possible to improve the assemblability of the fin-assembled tube 30.

In addition, according to this embodiment, there is provided the manufacturing method for manufacturing the fin-assembled tube 30 including a step of fixing the tip-end portion 11A (part) of the fin material 11 to the inner tube 20 and a step of twisting the fin material 11 by utilizing the tip-end portion 11A fixed to the inner tube 20 as the supporting point.

With such a method, the helical fin 10 is arranged at a predetermined position in the inner tube 20 by utilizing the tip-end portion 11A of the fin material 11 fixed to the inner tube 20 as a reference.

The portion of the fin material 11 to be fixed to the inner tube 20 is not limited to the tip-end portion 11A, and it may be a portion of the fin material 11 in a middle region.

In addition, according to this embodiment, there is provided the manufacturing method for manufacturing the fin-assembled tube 30 including a step of inserting the core rod 60 supporting the fin material 11 into the interior of the inner tube 20 and a step of twisting the fin material 11 by a relative movement in which the core rod 60 is withdrawn from the inner tube 20 while rotating the core rod 60 and the inner tube 20 relative to each other.

With such a method, by controlling, using the controller, a moving speed of the core rod 60 moved by the actuating mechanism 75 in the axis O direction of the inner tube 20 and a rotating speed of the core rod 60 rotated by the actuating mechanism 65, it is possible to twist the fin material 11 at arbitrary positions with respect to the inner tube 20. Thus, in the fin-assembled tube 30, it is possible to set the twisted position of the helical fin 10 with respect to the inner tube 20 arbitrarily.

In the above-described embodiment, the manufacturing apparatus 50 is configured such that the core rod 60 is inserted into and rotated in the interior of the inner tube 20. The configuration is not limited thereto, and the manufacturing apparatus 50 may also be configured to include a support member (the core rod 60) that supports an end portion of the fin material 11 at outside the inner tube 20. In this case, with the manufacturing apparatus 50, the helical fin 10 is formed by twisting the fin material 11 in the interior of the inner tube 20 by rotating the end portion of the fin material 11 by the support member at outside the inner tube 20.

Next, the method of manufacturing the fin-assembled tube 30 according to a modification will be described with reference to FIG. 6.

Figure 6:
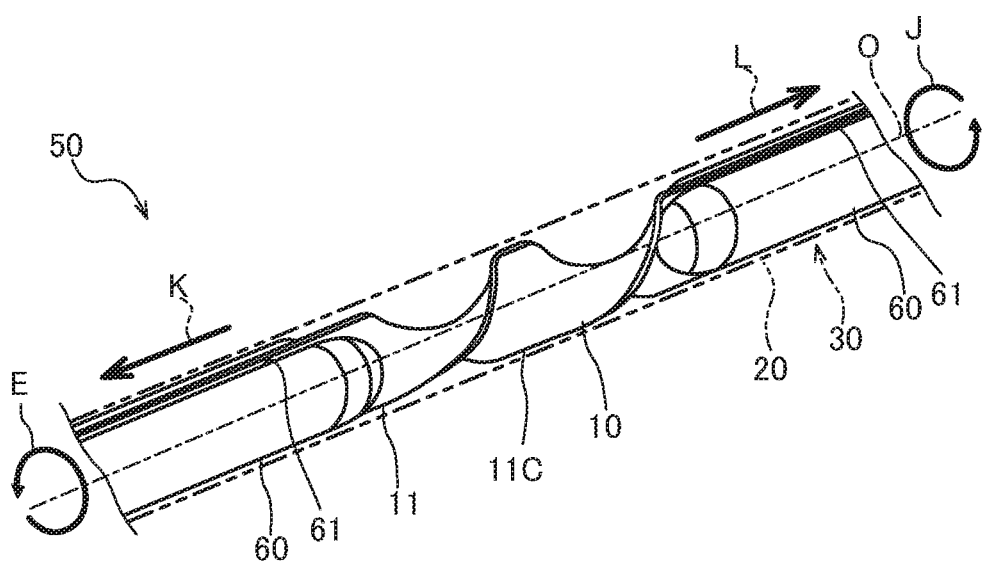
FIG. 6 is a perspective view showing a step for manufacturing the fin-assembled tube according to a modification.

As shown in FIG. 6, the fin material 11 is first inserted into the inner tube 20, and a portion 11C of the fin material 11 in the middle region thereof is fixed to the inner tube 20 by crimping the outer circumference of the inner tube 20. Next, a pair of core rods 60 are inserted from both ends of the inner tube 20, and the fin material 11 is arranged over respective slits 61 of the core rods 60. Then, as shown by arrows K and L, the respective core rods 60 are moved in the axis O direction so as to move away from each other, and at the same time, as shown by the arrows E and J in FIG. 6, the respective core rods 60 are rotated in opposite directions to each other.

With such a method, in the interior of the inner tube 20, the helical fin 10 is formed as the fin material 11 is twisted while being pulled out of the respective slits 61 of the core rods 60 that are rotated in the opposite directions.

As described above, according to this modification, there is provided the manufacturing method for manufacturing the fin-assembled tube 30 including a step of forming the helical fin 10 by rotating both end portions of the fin material 11 in the opposite directions to each other.

With such a method, it is possible to shorten the time required to twist the fin material 11.

Next, the method of manufacturing the fin-assembled tube 30 according to a modification will be described with reference to FIGS. 7 to 10.

Figure 7:
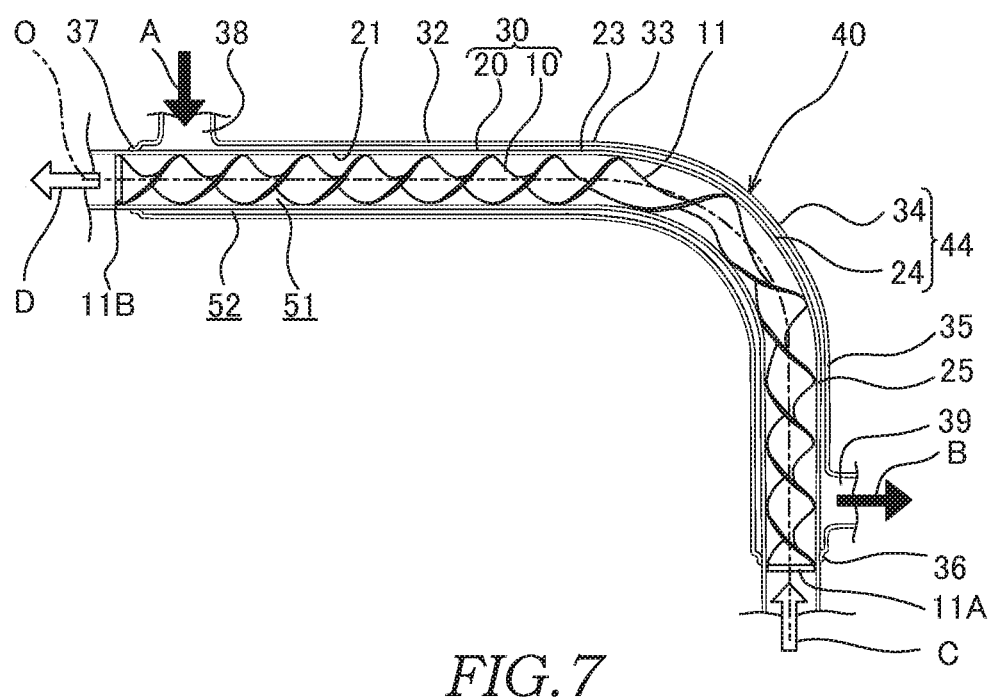
FIG. 7 is a sectional view showing the double tube according to a modification.

As shown in FIG. 7, the double tube 40 according to this modification has a curved portion 44 that has been formed by curving the middle region of the double tube 40. The inner tube 20 has a bent portion 24 that forms the curved portion 44 and straight tube portions 23 and 25 that extend in a straight line from the bent portion 24. The outer tube 32 has a bent portion 34 that forms the curved portion 44 and straight tube portions 33 and 35 that extend in a straight line from the bent portion 34.

As shown in FIG. 2, the bend die 81 of the manufacturing apparatus 50 has a forming groove 81A that extends in an arc shape centered at the bending center axis S. The pressure die 82 has a guide groove 82A that extends in the axis O direction. The inner tube 20 is supported between the forming groove 81A and the guide groove 82A in a freely slidable manner and is guided so as to move in the axis O direction. The clamp die 83 has a clamp groove (not shown) for holding the outer circumference of the inner tube 20.

In a state in which the inner tube 20 is held between the bend die 81 and the clamp die 83, the bend die 81 and the clamp die 83 are rotated by an actuating mechanism (not shown) about the bending center axis S. With such a configuration, the inner tube 20 that has been sent out by the actuating mechanism 75 is bent so as to follow the forming groove 81A.

Figure 8:
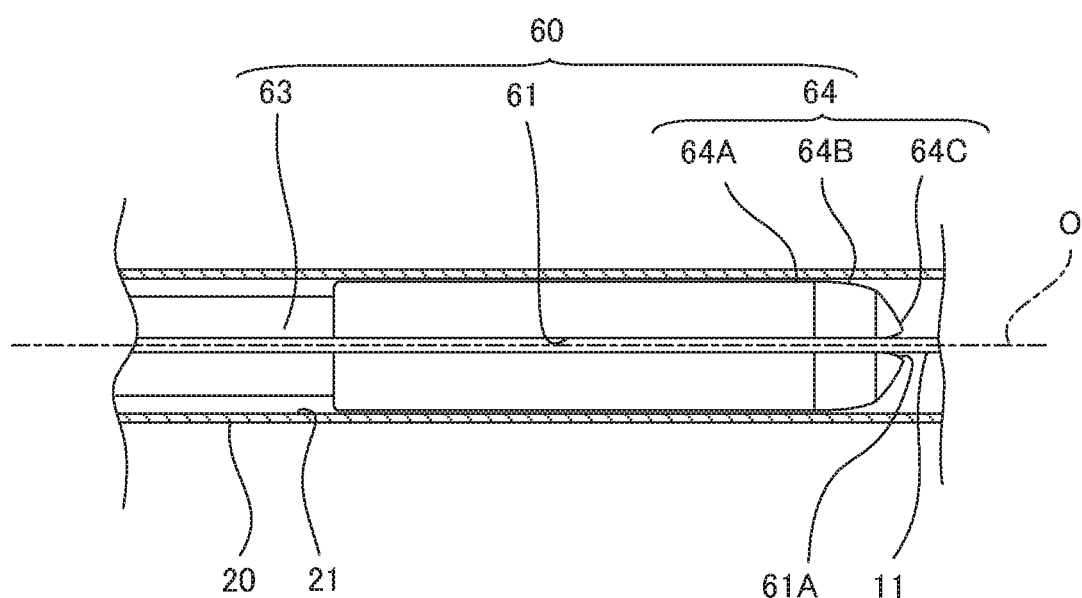
FIG. 8 is a plan view showing a core rod.

As shown in FIG. 8, the tip-end portion 64 of the core rod 60 has a die portion 64A that is brought into sliding contact with the inner surface 21 of the inner tube 20, and a die tip-end portion 64B and a tip-end relief portion 64C that extend such that the diameters are decreased gradually from the die portion 64A in the axis O direction.

The die portion 64A is formed to have a columnar shape. An outer circumferential surface of the die portion 64A faces the inner surface 21 of the inner tube 20 with a gap between the die portion 64A and the inner surface 21. As described later, the die portion 64A is configured such that, during the bending process, the bent portion 24 is formed as the die portion 64A is brought into contact with the inner surface 21 of the inner tube 20 in the vicinity of the bent portion 24 while being rotated relatively.

The die tip-end portion 64B is formed to have a spindle shape a diameter of which is decreased from the die portion 64A without having irregularities. An outer circumferential surface of the die tip-end portion 64B extends from the outer circumferential surface of the die portion 64A so as to form a round surface without being bent. As described later, the die tip-end portion 64B is configured such that, during the bending process, the bent portion 24 is formed as the die tip-end portion 64B is brought into contact with the inner surface 21 of the bent portion 24 while being rotated relatively.

The tip-end relief portion 64C projects from the die tip-end portion 64B such that its diameter is reduced further. As described later, the tip-end relief portion 64C is configured so as not to interfere with the inner surface 21 of the bent portion 24 during the bending process.

An open end portion 61A of the slit 61 opens at the tip-end relief portion 64C such that the opening width is increased gradually.

In the following, steps for manufacturing the fin-assembled tube 30 using the manufacturing apparatus 50 will be described in order.

As shown by the arrow G in FIG. 2, the fin material 11 is first inserted into the inner tube 20. Then, as shown in FIG. 3, the tip-end portion 11A of the fin material 11 is fixed to the inner tube 20.

Next, as shown by the arrow H in FIGS. 4 and 5, the inner tube 20 is moved in the axis O direction relative to the core rod 60, and at the same time, as shown by the arrow E in FIGS. 4 and 5, the core rod 60 is rotated in one direction relative to the inner tube 20. In this way, the helical fin 10 is formed in the interior of the inner tube 20.

Figure 9:
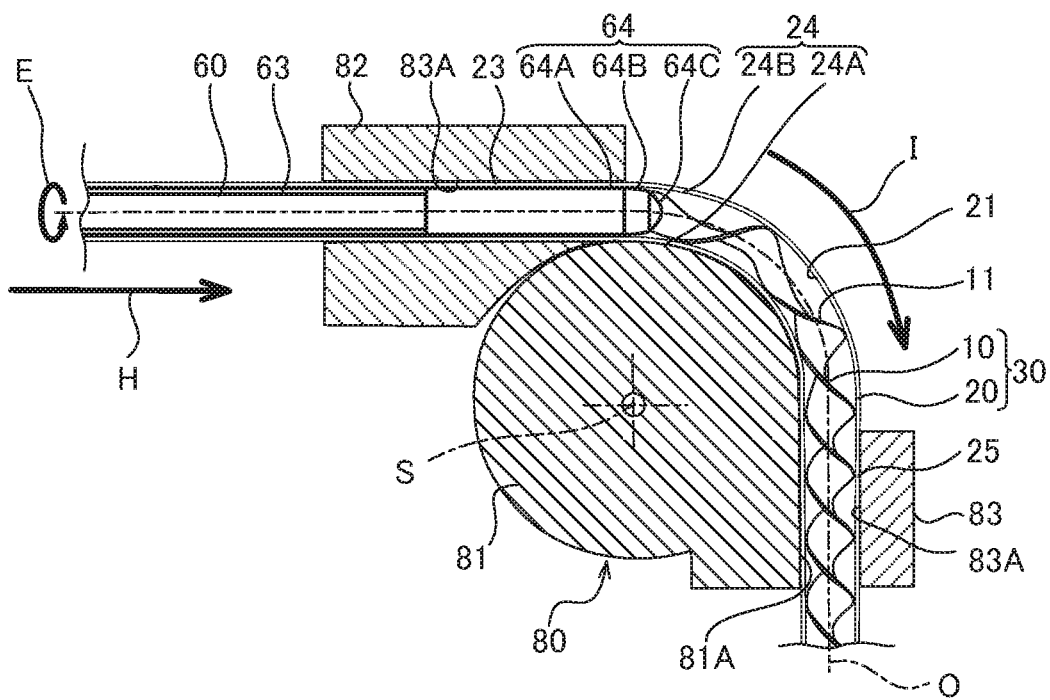
FIG. 9 is a sectional view showing a step for manufacturing the fin-assembled tube.
Figure 10:
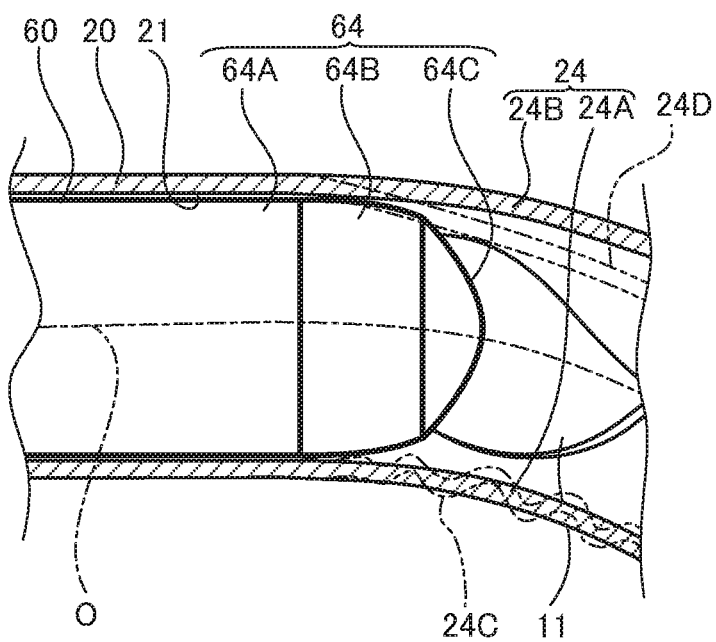
FIG. 10 is an enlarged sectional view of a part of FIG. 9.

Next, as shown in FIGS. 9 and 10, the bending machine 80 is operated to bend the inner tube 20. At this time, as shown by an arrow I, the bend die 81 and the clamp die 83 are rotated about the bending center axis S while holding the inner tube 20. By doing so, the inner tube 20 sent out by the actuating mechanism 75 as shown by the arrow H is bent so as to follow the arc-shaped forming groove 81A.

During the above-described bending process, in the inner tube 20, the bent portion 24 is formed as the outer circumference of the tip-end portion 64 of the core rod 60 is brought into contact with the inner surface 21 of the inner tube 20.

During the above-described bending process, although compressive stress is produced at a curved inner-side portion 24A positioned on the inside-corner side of the bent portion 24, because the columnar die portion 64A is brought into contact with the inner surface 21 of the inner tube 20 in the vicinity of the curved inner-side portion 24A, occurrence of buckling is suppressed. With such a method, as shown with two-dot chain line in FIG. 10, the formation of the forming failures such as the wrinkles 24C, etc. is suppressed in the curved inner-side portion 24A.

During the above-described bending process, although tensile stress is produced at a curved outer-side portion 24B positioned on the outside-corner side of the bent portion 24, because the spindle-shaped die tip-end portion 64B is brought into contact with the inner surface 21 of the inner tube 20 while being rotated relatively, an arc-shaped cross-sectional shape of the curved outer-side portion 24B is maintained. With such a method, as shown with the two-dot chain line in FIG. 10, in the curved outer-side portion 24B, formation of a portion 24D having excessively flattened cross-sectional shape is suppressed.

During the above-described bending process, the controller performs a control such that the rotating speed of the core rod 60 rotated by the actuating mechanism 65 as shown by the arrow E (see FIGS. 4 and 5) is reduced with respect to the moving speed of the inner tube 20 sent out by the actuating mechanism 75 in the axis O direction as shown by the arrow H (see FIGS. 4 and 5). By doing so, the helical fin 10 is formed such that a length in the axis O direction at which the fin material 11 is twisted by a certain angle about the axis O (helical pitch) becomes longer in the bent portion 24 relative to those in the straight tube portions 23 and 25. With such a method, in the bent portion 24, it is possible to suppress the change in a flexural rigidity of the helical fin 10 in accordance with an angle of the fin material 11 that is arranged in the interior of the bent portion 24. Thus, it is possible to increase a forming accuracy of the bent portion 24.

After the above-described bending process is performed, the clamp die 83 that has been holding the inner tube 20 is moved to an escape position by the bending machine 80. Then, the core rod 60 is rotated while the inner tube 20 is moved in the axis O direction relatively to the core rod 60, and thereby, the helical fin 10 is formed in the interior of the straight tube portion 23 of the inner tube 20.

As described above, the double tube 40 is manufactured by, after the fin-assembled tube 30 is manufactured, assembling the outer tube 32 having a multi-component structure to the fin-assembled tube 30 and by joining to the inner tube 20.

As described above, according to this modification, there is provided the method of manufacturing the fin-assembled tube 30 including a step of arranging the helical fin 10 in the interior of the inner tube 20 by inserting the core rod 60 supporting the helical fin 10 (fin) into the interior of the inner tube 20 (tube) and by bending the inner tube 20.

With such a method, in the fin-assembled tube 30, because the core rod 60 for supporting the fin material 11 is interposed in the interior of the inner tube 20 during the bending process of the inner tube 20, the formation of the forming failures such as the wrinkles 24C, etc. in the bent portion 24 of the inner tube 20 is suppressed. Thus, the formation of the forming failures in the bent portion 24 is suppressed in the fin-assembled tube 30.

In addition, according to this modification, there is provided the manufacturing method for manufacturing the fin-assembled tube 30 including a step of inserting the plate-shaped fin material 11 into the interior of the inner tube 20, a step of fixing the tip-end portion 11A (part) of the fin material 11 to the inner tube 20, and a step of forming the helical fin 10 into a helical shape by rotating the inner tube 20 and the core rod 60 relative to each other to twist the fin material 11 by the core rod 60.

With such a method, in the fin-assembled tube 30, the helical fin 10 is formed into the helical shape in the interior of the inner tube 20 by rotating the core rod 60. Therefore, when the fin-assembled tube 30 is manufactured, the step of inserting the helical fin 10, which has been formed into the helical shape, into the interior of the inner tube 20 is no longer required. Thus, it is possible to improve the assemblability of the fin-assembled tube 30.

The helical fin 10 is then arranged at a predetermined position in the inner tube 20 by utilizing the tip-end portion 11A of the fin material 11 fixed to the inner tube 20 as a reference.

In addition, according to this modification, there is provided the manufacturing method for manufacturing the fin-assembled tube 30 in which the core rod 60 has the slit 61 for receiving the fin material 11, and the core rod 60 is moved relative to the inner tube 20 in the axis O direction of the inner tube 20 while being rotated relative to the inner tube 20, thereby twisting the fin material 11 being pulled out of the slit 61.

With such a method, by changing, using the controller, the moving speed of the core rod 60 moved by the actuating mechanism 75 in the axis O direction of the inner tube 20 and the rotating speed of the core rod 60, it is possible to twist the fin material 11 at arbitrary positions with respect to the inner tube 20. Thus, in the fin-assembled tube 30, it is possible to set the twisted position of the fin material 11 with respect to the inner tube 20 arbitrarily.

In addition, according to this modification, there is provided the manufacturing method for manufacturing the fin-assembled tube 30 in which the core rod 60 has the die portion 64A that is brought into contact with the inner surface 21 of the inner tube 20 that has not been subjected to the bending process and the die tip-end portion 64B that projects such that the diameter thereof is reduced from the die portion 64A and so as to face the interior of the bent portion 24 of the inner tube 20.

With such a method, in the bent portion 24 of the inner tube 20, the die portion 64A of the core rod 60 that is rotated relatively is brought into contact with the inner surface 21 of the inner tube 20 that has not been subjected to the bending process, and thereby, the formation of the forming failures such as the wrinkles 24C, etc. in the curved inner-side portion 24A that is compressed during the bending process is suppressed. In addition, the curved outer-side portion 24B, which is elongated during the bending process, is brought into contact with the die tip-end portion 64B of the core rod 60 that is rotated relatively, and thereby, the bent portion 24 is suppressed from being flattened. As a result, the formation of the forming failures in the bent portion 24 is suppressed in the fin-assembled tube 30.

In this modification, the manufacturing apparatus 50 is configured such that the core rod 60 is inserted into and rotated in the interior of the inner tube 20. However, the configuration is not limited thereto, and the manufacturing apparatus 50 may be configured such that the core rod 60 is not rotated, and the fin material 11 is arranged in the interior of the inner tube 20 via the core rod 60. In this case, the fin-assembled tube 30 has a flat fin in the interior of the inner tube 20.

Next, the method of manufacturing the double tube 40 according to a modification will be described with reference to FIGS. 11 to 13.

In this modification, the inner tube 20 and the outer tube 32 are subjected to the bending process together after the outer tube 32 is joined to the inner tube 20.

In the following, steps for manufacturing the double tube 40 using the manufacturing apparatus 50 will be described in order.

Figure 11:
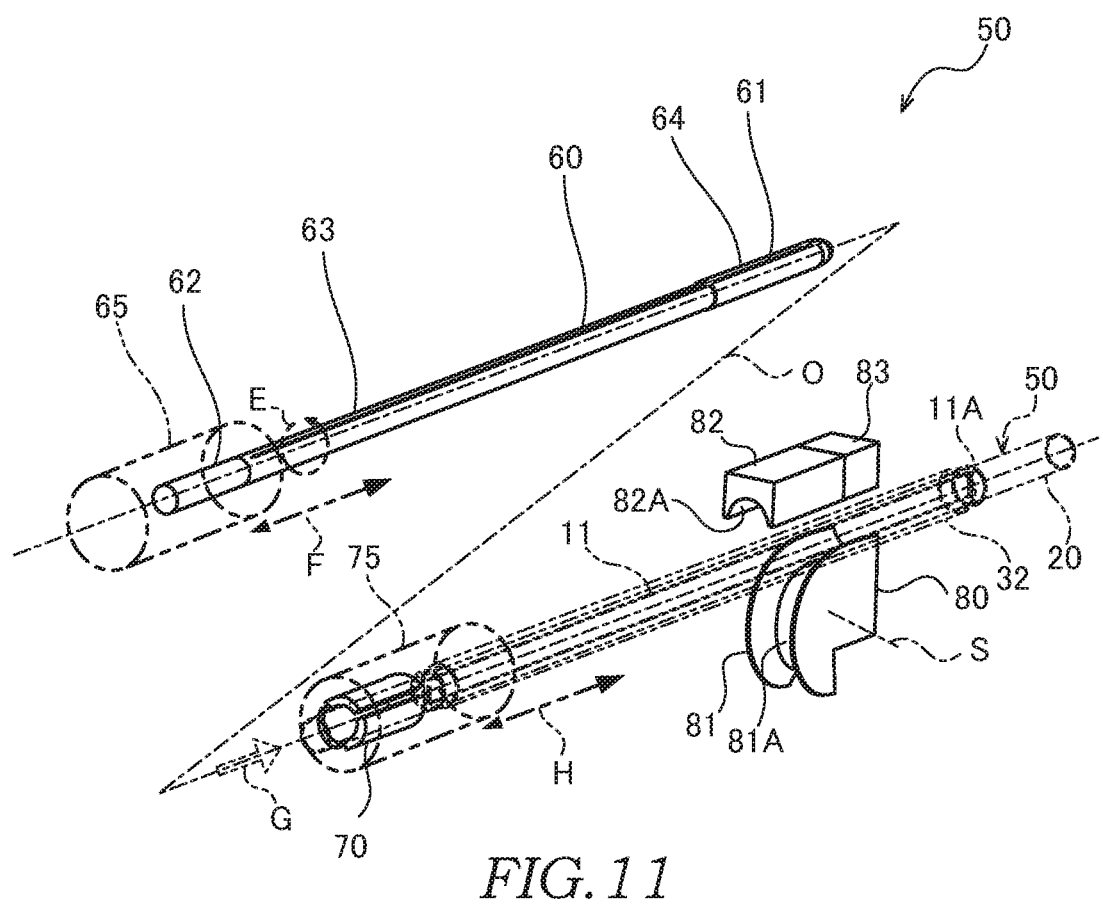
FIG. 11 is a perspective view showing a manufacturing apparatus of the double tube according to a modification.

As shown in FIG. 11, the outer tube 32 is first fitted to the inner tube 20, and both end portions of the outer tube 32 are joined to the inner tube 20 to form the double tube 40.

Next, as shown by the arrow G in FIG. 11, the fin material 11 is inserted into the interior of the inner tube 20. Then, the tip-end portion 11A of the fin material 11 is fixed to the inner tube 20 by crimping the outer circumference of the inner tube 20.

Next, as shown in FIGS. 3 to 6, the fin material 11 being pulled out of the slit 61 of the core rod 60 is twisted by utilizing the tip-end portion 11A as the supporting point. By doing so, the helical fin 10 is formed in the interior of the straight tube portion 25 of the inner tube 20.

Figure 12:
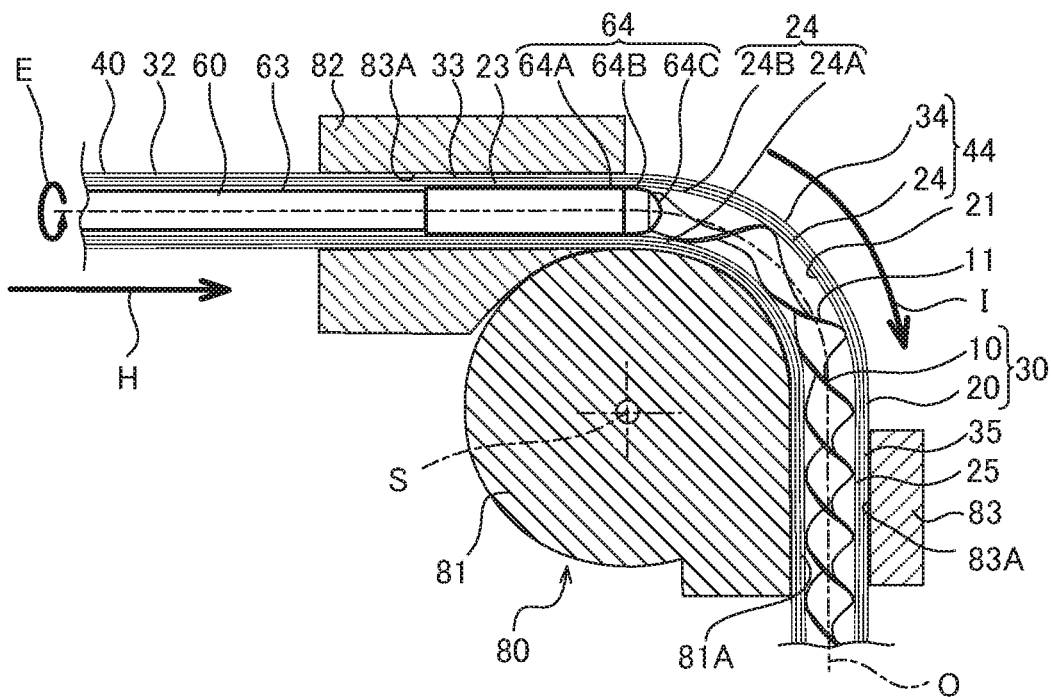
FIG. 12 is a sectional view showing a step for manufacturing the double tube.
Figure 13:
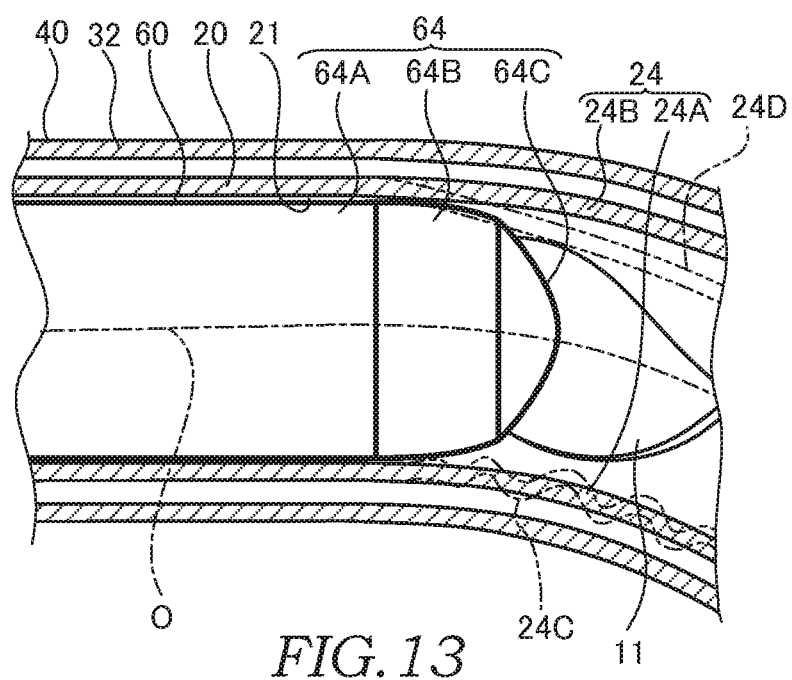
FIG. 13 is an enlarged sectional view of a part of FIG. 12.

Next, as shown in FIGS. 12 and 13, the double tube 40 formed of the inner tube 20 and the outer tube 32 is bent by operating the bending machine 80. At this time, the bend die 81 and the clamp die 83 are rotated about the bending center axis S as shown by the arrow I while holding the double tube 40. By doing so, the double tube 40 that is sent out by the actuating mechanism 75 as shown by the arrow H is bent so as to follow the arc-shaped forming groove 81A.

During the above-described bending process, in the inner tube 20, the bent portion 24 is formed as the outer circumference of the tip-end portion 64 of the core rod 60 is brought into contact with the inner surface 21 of the inner tube 20.

During the above-described bending process, although compressive stress is produced at the curved inner-side portion 24A positioned on the inside-corner side of the bent portion 24, because the columnar die portion 64A is brought into contact with the inner surface 21 of the inner tube 20 in the vicinity of the curved inner-side portion 24A, occurrence of buckling is suppressed. With such a method, as shown with two-dot chain line in FIG. 13, the formation of the forming failures such as the wrinkles 24C, etc. is suppressed in the curved inner-side portion 24A.

During the above-described bending process, although tensile stress is produced at the curved outer-side portion 24B positioned on the outside-corner side of the bent portion 24, because the spindle-shaped die tip-end portion 64B is brought into contact with the inner surface 21 of the inner tube 20 while being rotated relatively, an arc-shaped cross-sectional shape of the curved outer-side portion 24B is maintained. With such a method, as shown with the two-dot chain line in FIG. 13, in the curved outer-side portion 24B, formation of the portion 24D having excessively flattened cross-sectional shape is suppressed.

During the above-described bending process, the bent portion 34 of the outer tube 32 is bent smoothly so as to follow the bent portion 24 of the inner tube 20 without inserting the core rod between the inner tube 20 and the outer tube 32. With such a method, an actuating force of the actuating mechanism 65 for actuating the core rod 60 is suppressed.

During the above-described bending process, the controller performs a control such that the rotating speed of the core rod 60 rotated by the actuating mechanism 65 as shown by the arrow E is reduced with respect to the moving speed of the inner tube 20 sent out by the actuating mechanism 75 in the axis O direction as shown by the arrow H. By doing so, the helical fin 10 is formed such that the length in the axis O direction at which the fin material 11 is twisted by a certain angle about the axis O (the helical pitch) becomes longer in the bent portion 24 relative to those in the straight tube portions 23 and 25. With such a method, in the bent portion 24, it is possible to suppress, to a low level, the change in a flexural rigidity of the helical fin 10 in accordance with an angle of the fin material 11 that is arranged in the interior of the bent portion 24. Thus, it is possible to increase a forming accuracy of the bent portion 24.

After the above-described bending process is performed, the clamp die 83 that has been holding the double tube 40 is moved to the escape position by the bending machine 80. Then, the core rod 60 is rotated while the double tube 40 is moved in the axis O direction relatively to the core rod 60, and thereby, the helical fin 10 is formed in the interior of the straight tube portion 23 of the inner tube 20.

Next, the base end portion 11B of the fin material 11 is fixed to the inner tube 20 by crimping the outer circumference of the inner tube 20.

With such a method, the double tube 40 having the built-in helical fin 10 is manufactured.

As described above, according to this modification, there is provided the method of manufacturing the double tube 40 including a step of bending the inner tube 20 and the outer tube 32 together by inserting the core rod 60 only into the interior of the inner tube 20.

During the bending process of the double tube 40, the core rod 60 is inserted into the interior of the inner tube 20, and the inner tube 20 and the outer tube 32 are bent together in a state in which the core rod is not inserted between the inner tube 20 and the outer tube 32.

With such a method, the sliding resistance caused when the core rod 60 is moved in the double tube 40 is minimized, and the bending process of the double tube 40 is performed smoothly.

In addition, according to this modification, there is provided the manufacturing method for manufacturing the double tube 40 including a step of inserting the plate-shaped fin material 11 into the interior of the inner tube 20, a step of fixing the tip-end portion 11A (part) of the fin material 11 to the inner tube 20, and a step of forming the helical fin 10 into the helical shape by rotating the inner tube 20 and the core rod 60 relative to each other to twist the fin material 11 by the core rod 60.

With such a method, the helical fin 10 is formed into the helical shape in the interior of the inner tube 20 as the core rod 60 is rotated relatively. Therefore, when the double tube 40 is manufactured, the step of inserting the helical fin 10, which has been formed into the helical shape, into the interior of the double tube 40 is no longer required. Thus, it is possible to improve the assemblability of the double tube 40 and to shorten the time required for manufacturing the double tube 40.

It is thus possible to arrange the helical fin 10 at a predetermined position in the double tube 40 by utilizing the tip-end portion 11A of the fin material 11 fixed to the inner tube 20 as a reference.

The portion of the fin material 11 to be fixed to the inner tube 20 is not limited to the tip-end portion 11A, and it may be a portion of the fin material 11 in a middle region.

In addition, according to this modification, there is provided the manufacturing method for manufacturing the double tube 40 in which the core rod 60 has the slit 61 for receiving the fin material 11, and the core rod 60 and the inner tube 20 are moved in the axis O direction of the inner tube 20 while they are rotated relative to each other, thereby twisting the fin material 11 being pulled out of the slit 61.

With such a method, by changing, using the controller, the moving speed of the core rod 60 moved by the actuating mechanism 75 in the axis O direction of the inner tube 20 and the rotating speed of the core rod 60, it is possible to twist the fin material 11 at arbitrary positions with respect to the inner tube 20. Thus, in the double tube 40, it is possible to set the twisted position of the fin material 11 with respect to the inner tube 20 arbitrarily.

In addition, according to this modification, there is provided the manufacturing method for manufacturing the double tube 40 in which the core rod 60 has the die portion 64A that is brought into contact with the inner surface 21 of the inner tube 20 that has not been subjected to the bending process and the die tip-end portion 64B that projects such that the diameter thereof is reduced from the die portion 64A and so as to face the interior of the bent portion 24 of the inner tube 20.

With such a method, in the bent portion 24 of the inner tube 20, the die portion 64A of the core rod 60 that is rotated relatively is brought into contact with the inner surface 21 of the inner tube 20 that has not been subjected to the bending process, and thereby, the formation of the forming failures such as the wrinkles 24C, etc. in the curved inner-side portion 24A that is compressed during the bending process is suppressed. In addition, the curved outer-side portion 24B, which is elongated during the bending process, is brought into contact with the die tip-end portion 64B of the core rod 60 that is rotated relatively, and thereby, the bent portion 24 is suppressed from being flattened. As a result, the formation of the forming failures in the bent portion 24 is suppressed in the double tube 40.

In addition, in the above-described modification, the manufacturing apparatus 50 is configured such that the core rod 60 is inserted into and rotated in the interior of the inner tube 20. However, the configuration is not limited thereto, and the manufacturing apparatus 50 may be configured such that the core rod 60 is not rotated, and the fin material 11 is arranged in the interior of the inner tube 20 via the core rod 60. In this case, the fin-assembled tube 30 has a flat fin in the interior of the inner tube 20.

Next, the method of manufacturing the double tube 40 according to a modification will be described with reference to FIGS. 14 to 16.

In this modification, the helical fin 10 is formed in a separate step from the step for bending the double tube 40.

The manufacturing apparatus 50 includes a hollow cylindrical core rod 68. The core rod 68 has a tip-end portion 69 for forming the bent portion 24. The tip-end portion 69 of the core rod 68 has an external shape similar to that of the tip-end portion 64 of the core rod 60 and has an opening portion (not shown) through which the helical fin 10 is inserted.

In the following, steps for manufacturing the double tube 40 using the manufacturing apparatus 50 will be described in order.

Figure 14:
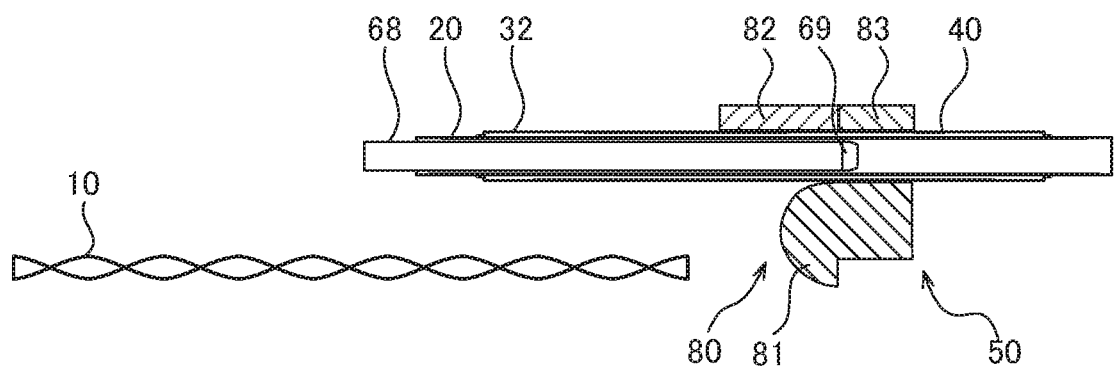
FIG. 14 is a sectional view showing a step for manufacturing the double tube according to a modification.

As shown in FIG. 14, the double tube 40 is first set to the manufacturing apparatus 50.

Figure 15:
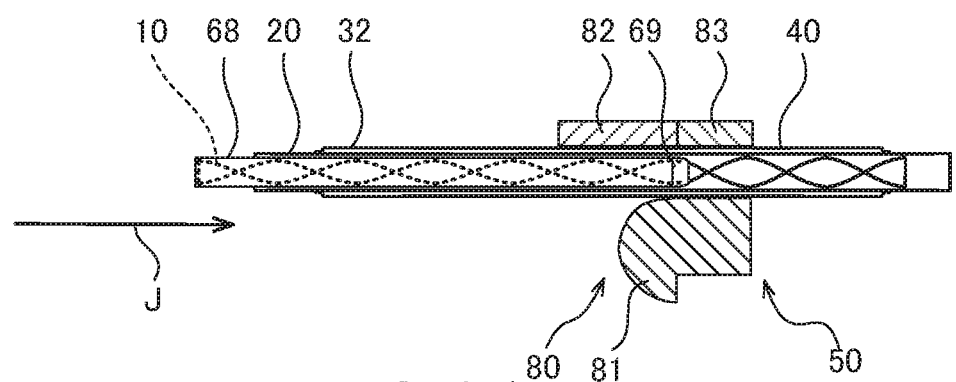
FIG. 15 is a sectional view showing a step for manufacturing the double tube.

Next, as shown by the arrow J in FIG. 15, the helical fin 10 that has been formed in advance is inserted into the interior of the inner tube 20 via the core rod 68.

Figure 16:
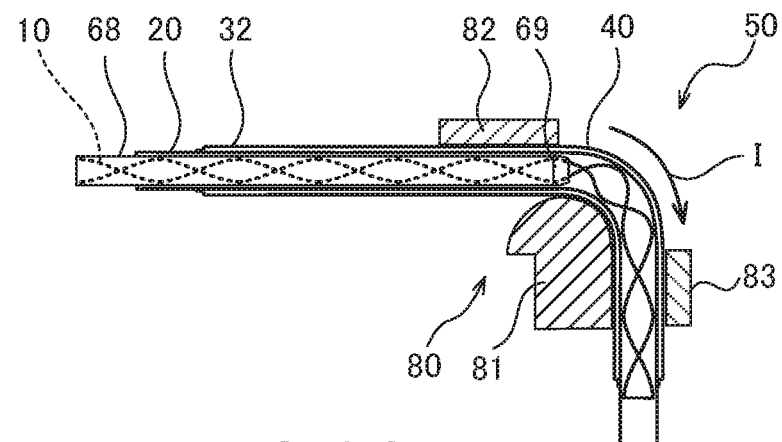
FIG. 16 is a sectional view showing a step for manufacturing the double tube.

Then, as shown by the arrow I in FIG. 16, the bend die 81 and the clamp die 83 of the bending machine 80 are rotated to bend the double tube 40.

During the bending process of the double tube 40, by prohibiting rotation of the core rod 68 with respect to the inner tube 20 and by bringing the tip-end portion 69 of the core rod 68 into contact with the inner surface 21 of the inner tube 20, the inner tube 20 and the outer tube 32 are formed smoothly.

The configuration is not limited to that described above, and it may be possible to employ a configuration in which, during the bending process of the double tube 40, the core rod 68 is rotated relative to the inner tube 20, and the inner tube 20 and the outer tube 32 are formed by causing the tip-end portion 69 of the core rod 68 to slide on the inner surface 21 of the inner tube 20.

In addition, the manufacturing apparatus 50 may have a configuration in which the helical fin 10 is formed during a process of passing the plate-shaped fin material 11 through the core rod 68.

Although the embodiments of the present invention have been described in the above, the above-described embodiments merely illustrate a part of application examples of the present invention, and the technical scope of the present invention is not intended to be limited to the specific configurations in the above-described embodiments.

Although the fin-assembled tube 30 of the above-described embodiment is suitable as a heat exchange tube for forming the heat exchanger, the fin-assembled tube 30 may also be applied to a machine or facilities other than the heat exchanger.

The invention claimed is:

1. A method of manufacturing a fin-assembled tube by arranging a helical fin in an interior of a tube, comprising:
    a step of inserting a plate-shaped fin material into the interior of the tube; and
    a step of forming the helical fin by twisting the fin material in the interior of the tube.

2. The method of manufacturing the fin-assembled tube according to claim 1, wherein a part of the fin material is fixed to the tube, and in the step of forming the helical fin, the fin material is twisted by utilizing a portion fixed to the tube as a supporting point.

3. The method of manufacturing the fin-assembled tube according to claim 2, further comprising:
    inserting a core rod for supporting the fin material into the interior of the tube, and
    in the step of forming the helical fin, the fin material is twisted by relatively moving the core rod and the tube in an axis direction of the tube while rotating the core rod and the tube relative to each other.

4. The method of manufacturing the fin-assembled tube according to claim 3, wherein the tube is bent by inserting the core rod for supporting the fin material into the interior of the tube.

5. The method of manufacturing the fin-assembled tube according to claim 4, wherein, in the step of forming the helical fin, the helical fin is formed by rotating the tube and the core rod relative to each other and by twisting the fin material by the core rod.

6. The method of manufacturing the fin-assembled tube according to claim 5, wherein the core rod has a slit for receiving the fin material, and
    in the step of forming the helical fin, the fin material is twisted, the fin material being pulled out of the slit as the core rod is moved relative to the tube in the axis direction of the tube while the core rod is rotated relative to the tube.

7. The method of manufacturing the fin-assembled tube according to claim 6, wherein the core rod has:
    a die portion brought into contact with an inner surface of the tube that has not been subjected to a bending process; and
    a die tip-end portion projected such that a diameter is reduced from the die portion and so as to face an interior of a bent portion of the tube.

8. A method of manufacturing a double tube, comprising:
    manufacturing the fin-assembled tube according to the method of claim 2, wherein the fin-assembled tube is an inner tube;
    providing an outer tube around the inner tube; and
    bending the inner tube and the outer tube together by inserting a core rod for supporting the fin material only into an interior of the inner tube.

9. The method of manufacturing the double tube according to claim 8, further comprising:

forming the helical fin by twisting the fin material by the core rod by rotating the inner tube and the core rod relative to each other.

10. The method of manufacturing the double tube according to claim 9, wherein the core rod has a slit for supporting the fin material, and as the fin material is twisted, the fin material is pulled out of the slit as the core rod and the inner tube are moved in an axis direction of the inner tube relative to each other while the core rod and the inner tube are rotated relative to each other.

11. The method of manufacturing the double tube according to claim 10, wherein the core rod has:

a die portion brought into contact with an inner surface of the inner tube that has not been subjected to a bending process; and a die tip-end portion projected such that a diameter is reduced from the die portion and so as to face an interior of a bent portion of the tube.

* * * * *